US010009347B2

(12) United States Patent
Kawamura et al.

(10) Patent No.: US 10,009,347 B2
(45) Date of Patent: Jun. 26, 2018

(54) COMMUNICATION DEVICE, COMMUNICATION METHOD, AND COMMUNICATION SYSTEM

(71) Applicants: Shintaro Kawamura, Kanagawa (JP); Masaru Kuroda, Tokyo (JP); Kohki Ohhira, Tokyo (JP); Ryusuke Mayuzumi, Kanagawa (JP); Hiroki Sugino, Kanagawa (JP)

(72) Inventors: Shintaro Kawamura, Kanagawa (JP); Masaru Kuroda, Tokyo (JP); Kohki Ohhira, Tokyo (JP); Ryusuke Mayuzumi, Kanagawa (JP); Hiroki Sugino, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 174 days.

(21) Appl. No.: 15/004,167

(22) Filed: Jan. 22, 2016

(65) Prior Publication Data
US 2016/0248774 A1    Aug. 25, 2016

(30) Foreign Application Priority Data
Feb. 24, 2015  (JP) ................................. 2015-034420

(51) Int. Cl.
*H04L 29/06* (2006.01)
*H04W 12/06* (2009.01)
(Continued)

(52) U.S. Cl.
CPC .............. *H04L 63/10* (2013.01); *H04L 63/08* (2013.01); *H04L 63/18* (2013.01); *H04W 4/80* (2018.02); *H04W 12/06* (2013.01); *H04W 76/15* (2018.02)

(58) Field of Classification Search
CPC ......... H04L 63/10; H04L 63/18; H04L 63/08; H04W 12/06; H04W 4/008; H04W 76/025

See application file for complete search history.

(56) References Cited

U.S. PATENT DOCUMENTS 7,353,391 B2   4/2008  Sato et al.
7,675,889 B2   3/2010  Nakao et al.
(Continued)

FOREIGN PATENT DOCUMENTS

EP    2717632 A2    4/2014
JP    3669293       7/2005
(Continued)

OTHER PUBLICATIONS

European official action dated Jul. 25, 2016 including search report in corresponding European Patent Application No. 16153876.4.

*Primary Examiner* — Beemnet Dada
(74) *Attorney, Agent, or Firm* — Cooper & Dunham LLP

(57) ABSTRACT

A communication device includes a first communication unit configured to execute radio communication by using a first communication method, the first communication method allowing the radio communication to be executed within a first communication range; a second communication unit configured to execute radio communication by using a second communication method, the second communication method allowing the radio communication to be executed within a second communication range; and a permission processing unit configured to generate communication permission information to permit executing the radio communication by the first communication method, wherein the second communication unit is configured to receive setting information for establishing the radio communication by the first communication method, and wherein the first communication unit is configured to execute the radio communi- (Continued)

cation by using the first communication method with another communication device that receives the setting information and the communication permission information.

8 Claims, 10 Drawing Sheets

(51) Int. Cl.
*H04W 4/80* (2018.01)
*H04W 76/15* (2018.01)

(56) References Cited

U.S. PATENT DOCUMENTS

| | | |
|---|---|---|
| 8,396,925 B2 | 3/2013 | Yoneda et al. |
| 8,793,367 B2 | 7/2014 | Hara |
| 8,818,276 B2 | 8/2014 | Kiukkonen et al. |
| 2004/0015575 A1 | 1/2004 | Motoyama |
| 2013/0029596 A1 | 1/2013 | Preston et al. |
| 2014/0099889 A1* | 4/2014 | Seo .................. H04W 52/0229 455/41.1 |

FOREIGN PATENT DOCUMENTS

| | | |
|---|---|---|
| JP | 2009-124409 | 6/2009 |
| JP | 4718748 | 7/2011 |
| JP | 5225033 | 7/2013 |
| JP | 2013-236316 | 11/2013 |
| JP | 5347403 | 11/2013 |
| JP | 2013-242925 | 12/2013 |

* cited by examiner

COMMUNICATION DEVICE, COMMUNICATION METHOD, AND COMMUNICATION SYSTEM

BACKGROUND OF THE INVENTION

1. Field of the Invention

The present invention relates to a communication system.

2. Description of the Related Art

A technique has been known such that, for connecting a device to an ad-hoc network that is formed of a radio network, such as a wireless local area network (LAN), authentication is automatically executed so as to obtain connection permission by using short-range radio communication with a communication area that is smaller than that of the ad-hoc network.

As a technique for establishing communications among devices, a technique has been know such that a device that has already participated in a radio network provides permission via proximity communication (cf. Patent Document 1 (Japanese Unexamined Patent Publication No. 2013-242925), for example).

SUMMARY OF THE INVENTION

For a case where a device is located in a communication area of short range radio communication, connection permission may be automatically provided for the device, even if the device is invisible due to a shield, such as a wall, which can be a security problem.

For connecting a device to an ad-hoc network that is formed of a radio network, it is desirable to enhance security for a communication system for automatically obtaining connection permission by using short range communication with a communication area that is smaller than that of the ad-hoc network.

According to an aspect of the present invention, there is provided a communication device including a first communication unit configured to execute radio communication by using a first communication method, the first communication method allowing communication to be executed within a first communication range; a second communication unit configured to execute radio communication by using a second communication method, the second communication method allowing communication to be executed within a second communication range; and a permission processing unit configured to generate communication permission information to permit executing communication by the first communication method, wherein the second communication unit is configured to receive setting information for establishing communication by the first communication method, and wherein the first communication unit is configured to execute the radio communication by using the first communication method with another communication device that receives the setting information and the communication permission information.

According to another aspect of the present invention, there is provided a communication system including a first communication device; and a second communication device, wherein the first communication device includes a first communication unit configured to execute radio communication by using a first communication method, the first communication method allowing the radio communication to be executed within a first communication range; a second communication unit configured to execute radio communication by using a second communication method, the second communication method allowing the radio communication to be executed within a second communication range; and a permission processing unit configured to generate communication permission information to permit executing the radio communication by the first communication method, wherein the second communication unit is configured to receive setting information for establishing the radio communication by the first communication method, and wherein the first communication unit is configured to execute the radio communication by using the first communication method with the second communication device that receives the setting information and the communication permission information, wherein the second communication device includes a third communication unit configured to execute radio communication by using the first communication method, the first communication method allowing the radio communication to be executed within the first communication range; a fourth communication unit configured to execute radio communication by using the second communication method, the second communication method allowing the radio communication to be executed within the second communication range, wherein the fourth communication unit is configured to receive the setting information for establishing the radio communication by the first communication method, and wherein, upon receiving the setting information and the communication permission information, the third communication unit is configured to execute the radio communication by using the first communication method.

According to another aspect of the present invention, there is provided a communication method to be executed by a communication device including a first communication unit configured to execute radio communication by using a first communication method, the first communication method allowing the radio communication to be executed within a first communication range; and a second communication unit configured to execute radio communication by using a second communication method, the second communication method allowing the radio communication to be executed within a second communication range, wherein the method includes a step of generating communication permission information to permit executing the radio communication by the first communication method; a step of receiving, by the second communication unit, setting information for establishing the radio communication by the first communication method; and a step of executing, by the first communication unit, the radio communication by using the first communication method with another communication device that receives the setting information and the communication permission information.

According to an embodiment of the present invention, for connecting a device to an ad-hoc network that is formed of a radio network, security can be enhanced for a communication system for automatically obtaining connection permission by using short range radio communication with a communication area that is smaller than that of the ad-hoc network.

Other objects, features and advantages of the present invention will become more apparent from the following detailed description when read in conjunction with the accompanying drawings.

DETAILED DESCRIPTION OF THE PREFERRED EMBODIMENTS

Figure 1:
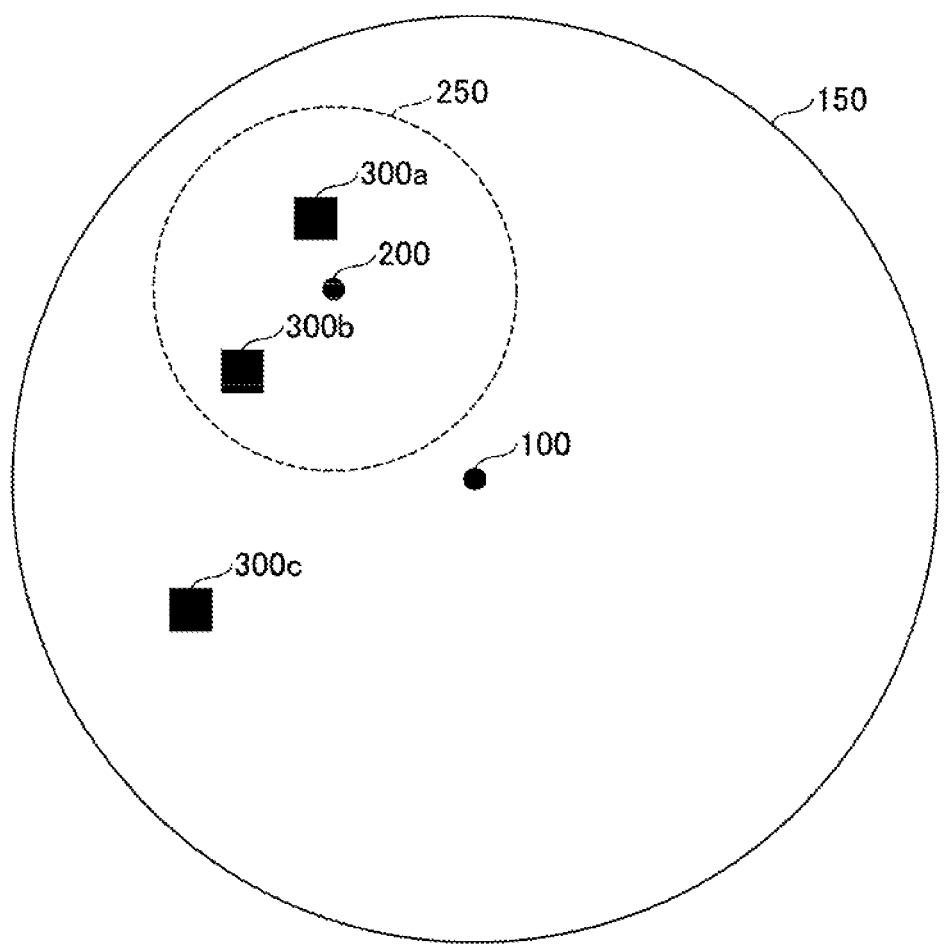
FIG. 1 is a diagram showing a configuration example of a radio communication system according to an embodiment.

Next, an embodiment of the present invention is described by referring to the accompanying drawings. The embodiment that is described below is merely an example, and embodiments to which the present invention is applied are not limited to the embodiment that is described below. Note that, in all the figures for describing the embodiment, the same reference numerals may be attached to components having the same functions, and thereby duplicate description may be omitted.

<Overview>
<Radio Communication System>

In a radio communication system according to the embodiment, within a first radio communication area for executing communication by a first communication method (e.g., a wireless local area network (LAN)), a radio network with a second radio communication area that is smaller than the first radio communication area can be formed by a second radio communication method (e.g., a personal area network (PAN)). Upon entering the wireless PAN, a device that communicate with the wireless LAN and the wireless PAN can obtain setup information, such as authentication information and setting information, that is transmitted from the wireless PAN and that is set for the wireless LAN. The device can be connected to the wireless LAN by using the setup information (e.g., the authentication information and the setting information) that is obtained from the wireless PAN. Furthermore, upon exiting from the wireless PAN, the device executes a process for disconnecting the communication with the wireless LAN. Namely, the device is allowed to communicate through the wireless LAN within a restricted radio communication area of the first radio communication area of the wireless LAN such that the restricted radio communication area overlaps the second radio communication area of the wireless PAN.

FIG. 1 shows a radio communication system according to the embodiment. The radio communication system according to the embodiment may include a first radio communication device 100; a second radio communication device 200; and third radio communication devices 300a-300c. Hereinafter, any third radio communication device among the third radio communication devices 300a-300c may be represented by "the third radio communication device 300."

The first radio communication device 100 can be installed in an access point or a radio base station, and the first radio communication device 100 can form a first radio communication area 150 by a first radio communication method (e.g., the wireless LAN). The second radio communication device 200 can be installed in an access point or a radio base station, and the second radio communication device 200 can form, within the first radio communication area 150, a second radio communication area 250 that is smaller than the first radio communication area 150 by a second radio communication method, such as short range radio communication (e.g., Bluetooth (registered trademark)). In the example that is shown in FIG. 1, the second radio communication area 250 is included in the first radio communication area 150.

The third radio communication device 300 can be installed in a mobile communication device, such as a smartphone, a tablet terminal, a mobile game device, and a laptop personal computer (PC); and the third radio communication device 300 can wirelessly communicate with the first radio communication device 100 and the second radio communication device 200.

Note that, if any one of the third radio communication devices 300a-300c is located in an overlap area where the first radio communication area 150 overlaps the second radio communication area 250, the one of the third radio communication devices 300a-300c can obtain setup information (e.g., authentication information and setting information) that is transmitted from the second radio communication device 200 and that can be used for establishing a connection with the first radio communication device 100. The one of the third radio communication devices 300a-300c that obtains the setup information can execute a connection process with the first radio communication device 100 by using the setup information.

In the example that is shown in FIG. 1, the overlap area is the same as the second radio communication area 250 because the second radio communication area 150 is included in the first radio communication area 150. The third radio communication devices 300a and 300b can obtain the setup information that is transmitted by the second radio communication device 200 because the third radio communication devices 300a and 300b are located in the overlap area, and the third radio communication devices 300a and 300b can execute connection processes with the first radio communication device 100, respectively, by using the setup information. Though the third radio communication device 300c is located in the first radio communication area, the third radio communication device 300c may not obtain the setup information that is transmitted by the second radio communication device 200 because the third radio communication device 300c is not located in the overlap area. Thus, the third radio communication device 300c may not execute a connection process with the first radio communication device 100.

Hereinafter, a case is described as an example where a wireless LAN is adopted as the first radio communication method, and Bluetooth (registered trademark) is adopted as the second radio communication method. Here, contactless radio (near field communications (NFC)) or ultrasonic communication, for example, may be adopted as the second radio communication method. Additionally or alternatively, the radio communication device 300 may obtain the setup information by using a QR code (registered trademark).

<Hardware Configuration According to the Embodiment>

Figure 2:
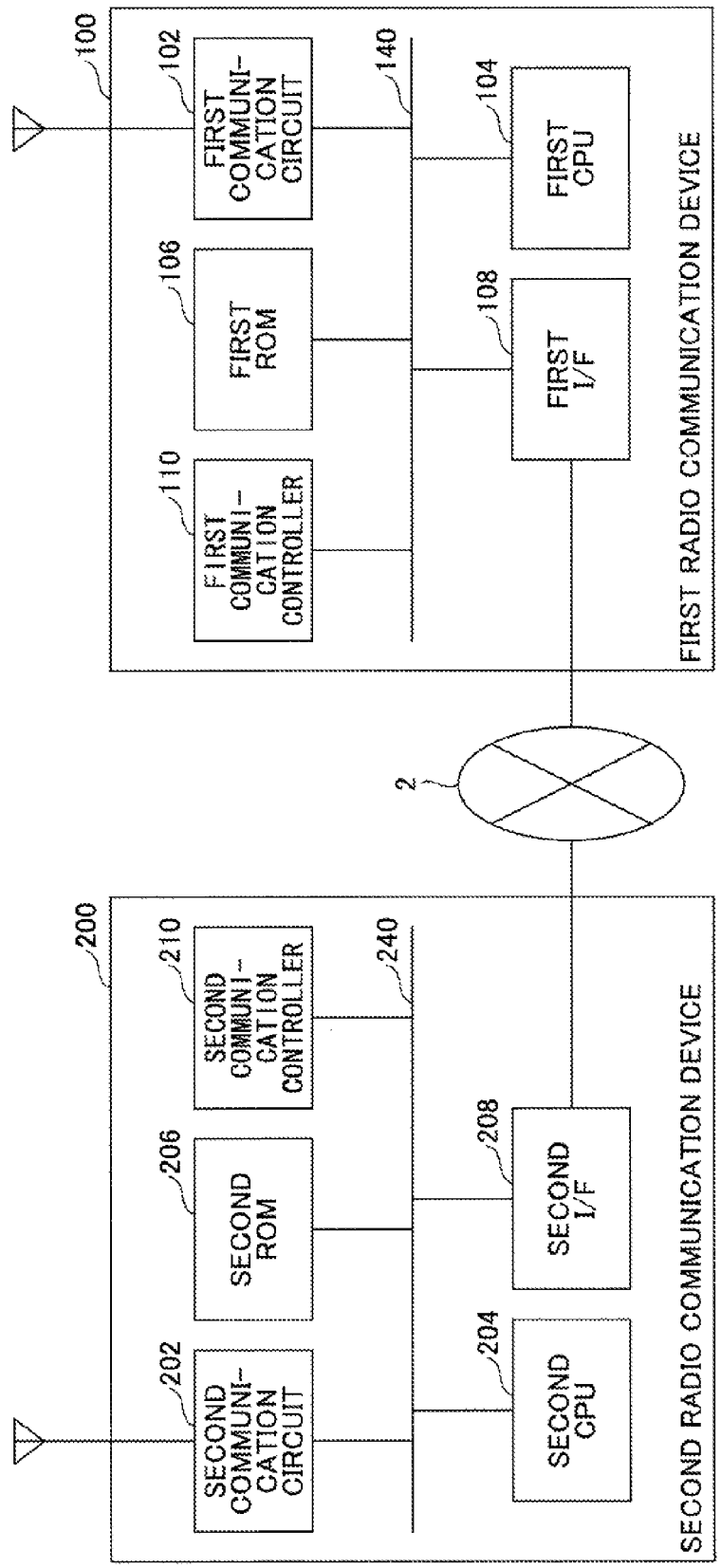
FIG. 2 is a diagram showing hardware configuration examples of a first radio communication device and a second radio communication device according to the embodiment.

Next, a hardware configuration according to the embodiment is described. FIG. 2 is a diagram showing hardware configuration examples of the first radio communication device 100 and the second radio communication device 200 according to the embodiment. As shown in FIG. 2, the first radio communication device 100 according to the embodiment may include a first communication circuit 102 for transmitting and receiving radio signals through an antenna in accordance with a standard of the first communication method; and a first central processing unit (CPU) 104 for controlling operations of the whole first radio communication device 100. Additionally, the first radio communication device 100 may include a first read-only memory (ROM) 106 that stores various types of data, such as a program for the first radio communication device that is used for driving the first CPU 104, transmit data, and so forth. Additionally, the first radio communication device 100 may include a first interface (I/F) 108 for executing data transmission through the communication network 2; and a first communication controller 110 for operating the first radio communication device 100 as an access point of the first radio communication method. The first communication circuit 102, the first CPU 104, the first ROM 106, the first I/F 108, and the first communication controller 110 can be connected by a first bus 140. The program for the first radio communication device 100 may be stored in a computer readable recording medium, such as a storage medium, as a file in an installable format or in an executable format, and the program for the first radio communication device 100 may be distributed.

The second radio communication device 200 according to the embodiment may include a second communication circuit 202 for transmitting and receiving radio signals through an antenna in accordance with a standard of the second communication method; and a second CPU 204 for controlling operations of the whole second radio communication device 200. Additionally, the second radio communication device 200 may include a second read-only memory (ROM) 206 that stores various types of data, such as a program for the second radio communication device 200 that is used for driving the second CPU 104, transmit data, and so forth. Additionally, the second radio communication device 200 may include a second interface (I/F) 208 for executing data transmission through the communication network 2; and a second communication controller 210 for operating the second radio communication device 200 as an access point of the second radio communication method. The second communication circuit 202, the second CPU 204, the second ROM 206, the second I/F 208, and the second communication controller 210 can be connected by a second bus 240. The program for the second radio communication device 200 may be stored in a computer readable recording medium, such as a storage medium, as a file in an installable format or in an executable format, and the program for the second radio communication device 200 may be distributed.

Here, the first radio communication device 100 and the second radio communication device 200 can be configured as a single radio communication device. In this case, the first I/F 108 and the second I/F 208 may be directly connected without passing through the communication network 2.

Figure 3:
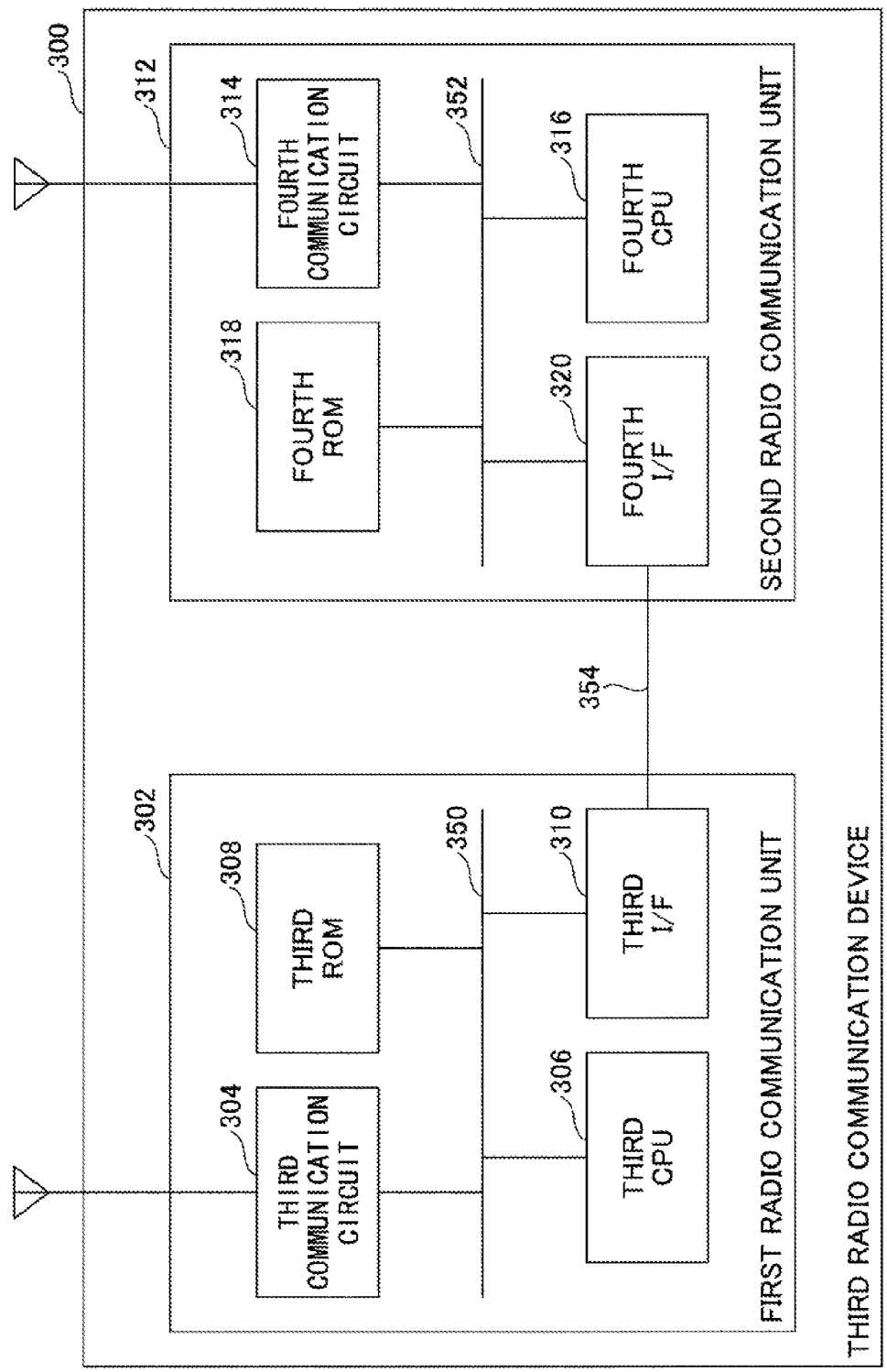
FIG. 3 is a diagram showing a hardware configuration example of a third communication device according to the embodiment.

FIG. 3 shows a hardware configuration example of the third radio communication device 300 according to the embodiment. As shown in FIG. 3, the third radio communication device 300 according to the embodiment may include a first radio communication unit 302 for executing radio communication in accordance with the standard of the first radio communication method; and a second radio communication unit 312 for executing radio communication in accordance with the standard of the second radio communication method.

The first radio communication unit 302 may include a third communication circuit 304 for transmitting and receiving radio signals through an antenna in accordance with the standard of the first communication method; and a third CPU 306 for controlling operations of the whole first radio communication unit 302. Additionally, the first radio communication unit 302 may include a third ROM 308 that stores various types of data, such as a program for the first radio communication unit 302 that is used for driving the third CPU 306, transmit data, and so forth; and a third I/F 310 for executing data transmission with the second radio communication unit 312. The third communication circuit 304, the third CPU 306, the third ROM 308, and the third I/F 310 can be connected by a third bus 350. The program for the first radio communication unit 302 may be stored in a computer readable recording medium, such as a storage medium, as a file in an installable format or in an executable format, and the program for the first radio communication unit 302 may be distributed.

The second radio communication unit 312 may include a fourth communication circuit 314 for transmitting and receiving radio signals through an antenna in accordance with the standard of the second communication method; and a fourth CPU 316 for controlling operations of the whole second radio communication unit 312. Additionally, the second radio communication unit 312 may include a fourth ROM 318 that stores various types of data, such as a program for the second radio communication unit 312 that is used for driving the fourth CPU 316, transmit data, and so forth; and a fourth I/F 320 for executing data transmission with the first radio communication unit 302. The fourth communication circuit 314, the fourth CPU 316, the fourth ROM 318, and the fourth I/F 320 can be connected by a fourth bus 352. Additionally, the third I/F 310 and the fourth I/F 320 may be connected by a bus 354. The program for the second radio communication unit 312 may be stored in a computer readable recording medium, such as a storage medium, as a file in an installable format or in an executable format, and the program for the second radio communication unit 312 may be distributed.

<Operation of the Radio Communication System (Version 1)>

Figure 4:
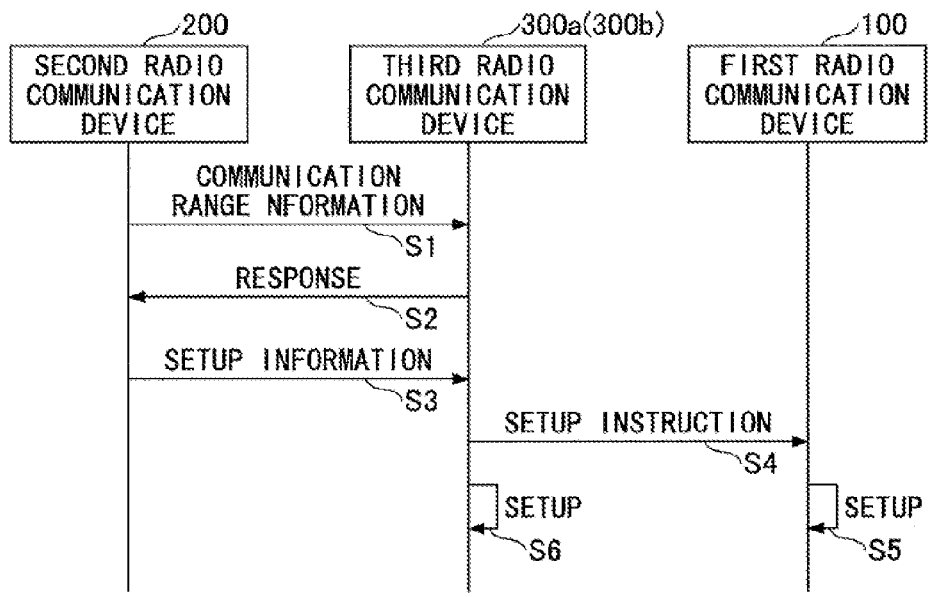
FIG. 4 is a sequence chart illustrating an operation of the radio communication system according to the embodiment.

FIG. 4 shows a connection process in the radio communication system according to the embodiment. In the example that is shown in FIG. 4, communication can be established by the third radio communication device 300a by executing the connection process with the first radio communication device 100. The connection process may be applied for a case where the third radio communication device 300b executes a connection process with the first radio communication device 100.

At step S1, the second radio communication device 200 that forms the second radio communication area 250 transmits, to the third radio communication device 300a, communication range information that indicates the second radio communication area 250. For example, the second radio communication device 200 may notify peripheral devices of the presence of the own device by transmitting advertisement packets through three advertisement channels. The advertisement packet may include the communication range information that indicates the second radio communication area 250.

At step S2, the third radio communication device 300a receives the communication range information that is transmitted by the second radio communication device 200, and the third radio communication device 300a transmits, to the second radio communication device 200, a response signal with respect to the communication range information. The third radio communication device 300a can recognize that the third radio communication device 300a is located within the second radio communication area 250 by referring to the communication range information.

At step S3, upon receiving the response signal that is transmitted by the third radio communication device 300a, the second radio communication device 200 executes a pairing process with the third radio communication device 300a. By doing this, communication between the second radio communication device 200 and the third radio communication device 300a by the second radio communication method can be established. The second radio communication device 200 transmits, to the third radio communication device 300a, setup information that is used for establishing connection with the first radio communication device 100 that forms the first radio communication area 150. For example, the second radio communication device 200 transmits, to the third radio communication device 300a, the setup information, such as a PIN code (unique identification information) based on the WPS method that is standardized by the Wi-Fi Alliance and that facilitates wireless LAN connection, by the second radio communication method.

At step S4, upon receiving the setup information that is transmitted by the second radio communication device 200, the third radio communication device 300a transmits, to the first radio communication device 100, a setup instruction signal for instructing setup by using the setup information.

At step S5, upon receiving the setup instruction signal that is transmitted by the third radio communication device 300a, the first radio communication device 100 sets up communication. At step S6, the third radio communication device 300a sets up communication. In this manner, in the overlap area where the first radio communication area overlaps the second radio communication area, communication in accordance with the first radio communication method can be established between the third radio communication device 300a and the first radio communication device 100.

As described above, in the radio communication system according to the embodiment, the third radio communication device 300 that is located in the overlap area where the first radio communication area 150 that is formed by the first radio communication device 100 overlaps the second radio communication area 250 that is formed by the second radio communication device 200 can obtain the setup information that is transmitted by the second radio communication device 200. Then, the third radio communication device 300 can set up communication with the first radio communication device 100 by using the setup information.

Consequently, the third radio communication device 300 can execute communication with another third radio communication device 300 through the first radio communication device 100.

Here, for a case where the first radio communication device 100 and the second radio communication device 200 are configured to be a single radio communication device, the setup instruction signal may be transmitted from the second radio communication device 200 to the first radio communication device 100.

<Operation of the Radio Communication System (Version 2)>

Figure 5:
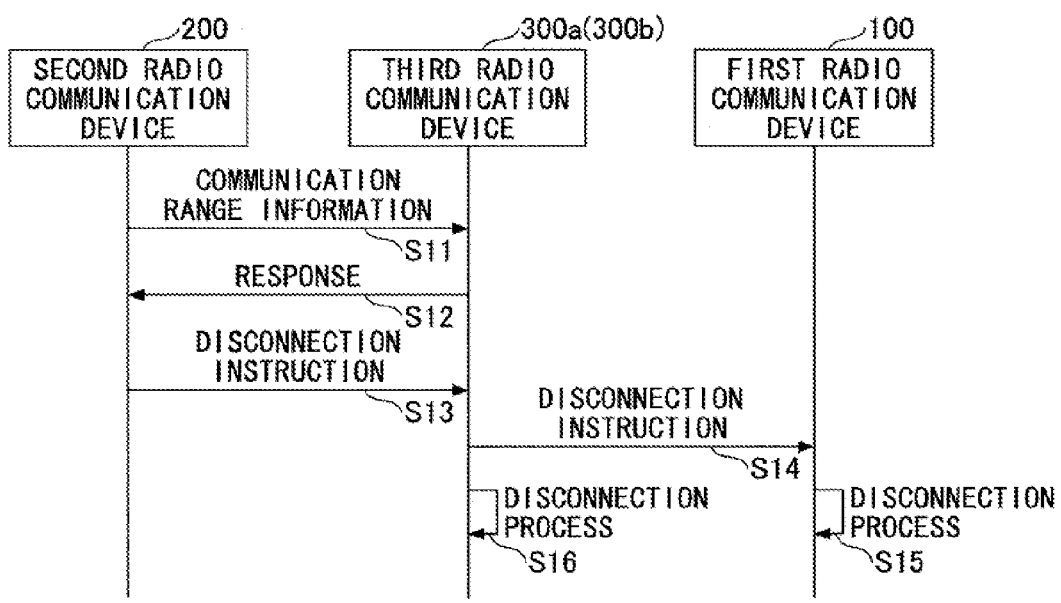
FIG. 5 is a sequence chart illustrating an operation of the radio communication system according to the embodiment.

FIG. 5 shows a disconnection process in the radio communication system according to the embodiment. In the example that is shown in FIG. 5, upon the third radio communication device 300a exiting from the second radio communication area 250, the communication that is established between the third radio communication device 300a and the first radio communication device 100 is disconnected. In the example that is shown in FIG. 5, the disconnection process can be applied for disconnecting, upon the third radio communication device 300b exiting from the second radio communication area 250, the communication that is established between the third radio communication device 300b and the first radio communication device 100.

At step S11, the second radio communication device 200 that forms the second radio communication area 250 transmits, to the third radio communication device 300a, the communication range information that indicates the second radio communication area 250 at predetermined timing.

The third radio communication device 300a includes a positioning device, such as a Global Positioning System (GPS) device, and the third radio communication device 300a detects, at step S12, the current location of the third radio communication device 300a. Similarly, the second radio communication device 200 includes a positioning device, such as a GPS device, and the second radio communication device 200 detects the current location of the second radio communication device 200. By comparing the communication range information that is transmitted by the second radio communication device 200 with the current location of the third radio communication device 300a that is detected by the positioning device, the third radio communication device 300a determines whether the current location of the third radio communication device 300a is within the second radio communication area 250. Additionally, the third radio communication device 300a may measure Received Signal Strength Indication (RSSI) of the communication range information that is transmitted by the second radio communication device 200, and the third radio communication device 300a may convert the RSSI into a distance. Then, by comparing the communication range information that is transmitted by the second radio communication device 200 with the distance that is obtained by converting the RSSI, the third radio communication device 300a may determine whether the current location of the third radio communication device 300a is within the second radio communication area 250. The third radio communication device 300a transmits, to the second radio communication device 200, a response signal to which information is attached that indicates whether the current location of the third radio communication device 300a is within the second radio communication area 250.

Upon receiving, from the third radio communication device 300a, a response signal that indicates that the current location of the third radio communication device 300a is outside the second radio communication area 250 at step S13, the second radio communication device 200 transmits, to the third radio communication device 300a, a disconnection instruction signal for instructing to disconnect the communication with the second radio communication device 200. Note that a coverage area of the radio waves of the second radio communication device 200 is set to be wider than the second radio communication area 250. Consequently, even if the third radio communication device 300a is located outside the second radio communication area 250, the third radio communication device 300a can receive the disconnection instruction signal that is transmitted by the second radio communication device 200.

Upon receiving, at step S14, the disconnection instruction signal that is transmitted by the second radio communication device 200, the third radio communication device 300a transmits, to the first radio communication device 100, a disconnection instruction signal for instructing to disconnect the communication with the third radio communication device 300a. At step S15, the first radio communication device 100 executes a process for disconnecting the communication with the third radio communication device 300a. At step S16, the third radio communication device 300a executes a process for disconnecting the communication with the first radio communication device 100. In this manner, the communication between the third radio communication device 300a and the first radio communication device 100 is disconnected.

Here, for a case where the first radio communication device 100 and the second radio communication device 200 are configured to be a single radio communication device, the disconnection instruction signal for disconnecting the connection may be transmitted from the second radio communication device 200 to the first radio communication device 100.

In this manner, in the radio communication system according to the embodiment, the communication between the third radio communication devices 300a and 300b can be restricted within the first radio communication area 150 that is formed by the first radio communication device 100 and within the second radio communication area 250. For the third radio communication device 300 that does not receive permission to establish communication with the first radio communication device 100 that forms the first radio communication area 150, the communication between the first radio communication device 100 and the third radio communication device 300 can be established while the third radio communication device 300 is located within the second radio communication area 250, and the communication between the first radio communication device 100 and the third radio communication device 300 can be used.

Embodiment

As a radio communication system according to this embodiment, the radio communication system that is described by referring to FIG. 1 can be adopted. In the radio communication system according to the embodiment, one of the third radio communication devices 300 that are located in the second radio communication area 250 and that are executing radio communication with the first radio communication device 100 has authority to permit a third radio communication device that newly enters the second radio communication area 250 to execute radio communication with the first radio communication device.

In the following description, the third radio communication device 300 that has the authority to permit another third radio communication device 300 that newly enters the second radio communication area 250 to execute radio communication with the first radio communication device 100 may be referred to as a "master device." In the embodiment, a case is described as an example where the third radio communication device 300c newly enters the second radio communication area 250, while assuming that the third radio communication device 300a is a master device. In response to detecting that the third radio communication device 300a permits the third radio communication device 300c to execute communication with the first radio communication device 100, the third radio communication device 300c can establish communication with the first radio communication device 100.

Here, it is assumed that the master device first establishes communication with the first radio communication device 100 because the master device executes a process of permitting the third radio communication device 300 that newly enters the second radio communication area 250 to execute radio communication with the first radio communication device 100. However, as described below, for a case where communication is established between a plurality of third radio communication devices and the first radio communication device, the authority for permitting to execute radio communication with the first radio communication device 100 can be transferred by assignment.

<Functional Configuration of the Embodiment>

Figure 6:
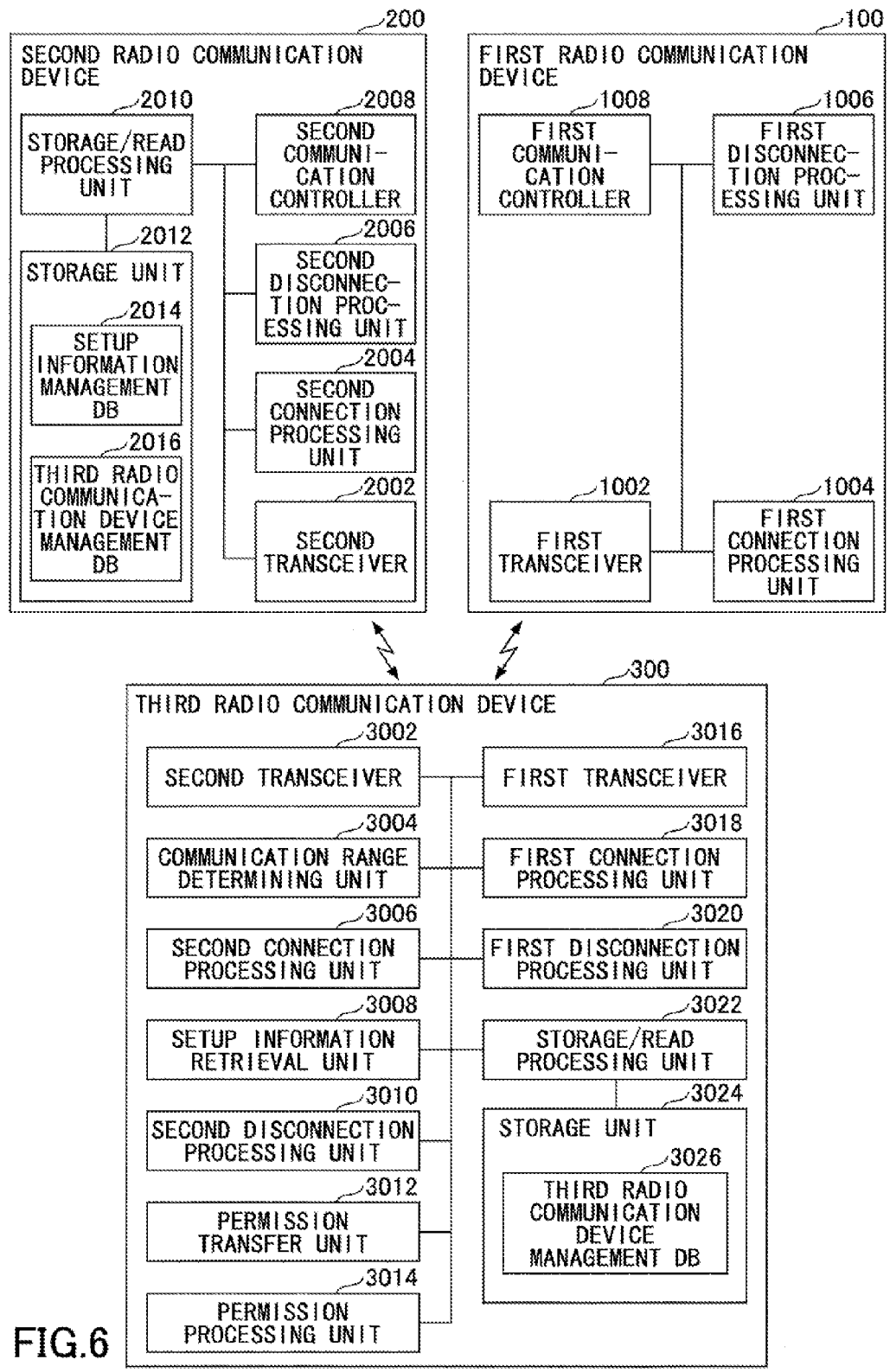
FIG. 6 is a functional block diagram showing the radio communication system according to the embodiment.

FIG. 6 is a functional block diagram of the first radio communication device 100, the second radio communication device 200, and the third radio communication device 300 according to the embodiment.

The first radio communication device 100 may include a first transceiver 1002; a first connection processing unit 1004; a first disconnection processing unit 1006; and a first communication controller 1008. These units can be functions or units that can be achieved by operating some components of the first radio communication device 100, which are shown in FIG. 2, by one or more instructions from the first CPU 104 in accordance with the program for the first radio communication device that is stored in the first ROM 106.

<First Radio Communication Device 100>

Next, each unit of the first radio communication device 100 is described in detail. The first transceiver 1002 of the first radio communication device 100 can be achieved by the first communication circuit 102, which is shown in FIG. 2, and one or more instructions from the first CPU 104; and the first transceiver 1002 can communicate various types of data (information) with the third radio communication device 300 by the first radio communication method.

The first connection processing unit 1004 of the first radio communication device 100 can be achieved by one or more instructions from the first CPU 104, which is shown in FIG. 2; and the first connection processing unit 1004 can establish communication by executing a connection process with the third radio communication device 300 based on the first radio communication method, by using the setup information that is transmitted from the third radio communication device 300.

The first disconnection processing unit 1006 of the first radio communication device 100 can be achieved by one or more instructions from the first CPU 104, which is shown in FIG. 2, and the first disconnection processing unit 1006 can disconnect communication with the third radio communication device 300 in accordance with a disconnection instruction that is transmitted by the third radio communication device 300.

The first communication controller 1008 of the first radio communication device 100 can be achieved by the first CPU 104, which is shown in FIG. 2, and one or more instructions from the first communication controller 110; and the first communication controller 1008 can execute communication control in accordance with the first radio communication method with the third radio communication device 300, for which the connection process is executed by the first connection processing unit 1004.

<Second Radio Communication Device 200>

The second radio communication device 200 may include a second transceiver 2002; a second connection processing unit 2004; a second disconnection processing unit 2006; a second communication controller 2008; a storage/read processing unit 2010; and a storage unit 2012. These units can be functions or units that can be achieved by operating some components of the second radio communication device 200, which are shown in FIG. 2, by one or more instructions from the second CPU 204 in accordance with the program for the second radio communication device that is stored in the second ROM 206.

(Setup Information Management Table)

In the storage unit 2012, a setup information management DB 2014 is provided, which includes a setup information management table, such as shown in Table 1.

TABLE 1

| SSID | Security method | Password | IP address | Port number |
|------|-----------------|----------|------------|-------------|
| zzzzzz | WPA2 | wwwwww | 192.168.10.10 | aa |

The setup information management table defines correspondence among connection information items by associating the connection information items, e.g., the network information, such as a Service Set Identifier (SSID), a security method, and a password; and the address information, such as IP address, and a port number, which are used by the third radio communication device 300 for attempting to establish connection with the first radio communication device 100 by the first communication method. The SSID is identification information of the wireless LAN; and the security method is represented by a standard of an encryption method, such as WEP, WPA, WPA2, WPA2-TKIP, and AES.

(Third Radio Communication Device Management Table)

In the storage unit 2012, a third radio communication device management DB 2016 is provided, which includes a third radio communication device management table, such as shown in Table 2.

TABLE 2

| Address of the third radio communication device in the second radio communication method | Type of the third radio communication device | IP address of the third radio communication device | Presence or absence of the authority to permit communication |
|---|---|---|---|
| Address of the third radio communication device 300a in the second radio communication method | Type of the third radio communication device 300a | IP address of the third radio communication device 300a | There is the authority |
| Address of the third radio communication device 300b in the second radio communication method | Type of the third radio communication device 300b | IP address of the third radio communication device 300b | There is no authority |
| . . . | . . . | . . . | . . . |

The third radio communication device management table defines correspondence among an address of the third radio communication device 300 in the second radio communication method; a type of the third radio communication device 300; an IP address of the third radio communication device 300; and presence or absence of the authority to permit communication, by associating them. The address of the third radio communication device 300 in the second radio communication method is obtained upon detecting the third radio communication device 300 by the second radio communication method, and the address of the third radio communication device 300 in the second radio communication method can be used to determine a range of communication that is executed by the second radio communication method. An example of the address of the third radio communication device 300 in the second radio communication method can be a Bluetooth address, such as BD_ADDR, or a Bluetooth device address. The type of the third radio communication device 300 represents a type of the device, such as a smart device. The presence or absence of the authority to permit communication represents presence or absence of the authority to permit a third radio communication device 300 that newly enters the second radio communication area 250 to execute communication with the first radio communication device, in other words, whether the third radio communication device 300 is the master device. The second radio communication device 200 selects a target to be controlled based on the information that is listed in the third radio communication device management table.

<Functional Units of the Second Radio Communication Device 200>

Next, each element of the second radio communication device 200 is described in detail. The second transceiver 2002 of the second radio communication device 200 can be achieved by the second communication circuit 202, which is shown in FIG. 2, and one or more instructions from the second CPU 204; and the second transceiver 2002 can communicate various types of data (information) with the third radio communication device 300 by the second radio communication method.

The second connection processing unit 2004 of the second radio communication device 200 can be achieved by one or more instructions from the second CPU 204, which is shown in FIG. 2; and the second connection processing unit 2004 can create communication range information that is to be transmitted to the third radio communication device 300, and the communication range information can be transmitted by the second transceiver 2002. Additionally, upon receiving a response signal that is transmitted from the third radio communication device 300 that includes the communication range information, the second connection processing unit 2004 can establish communication by executing a connection process with the third radio communication device 300. Additionally, upon detecting a third radio communication device 300 that newly enters the second radio communication area 250, the second connection processing unit 2004 reports the detection of the third radio communication device 300 that newly enters the second radio communication area 250 to the master device. Upon receiving, from the master device, a response that is permission to execute communication with the first communication device in response to the report, the second connection processing unit 2004 executes a connection process with the third radio communication device 300 that newly enters the second radio communication area 250.

The second disconnection processing unit 2006 of the second radio communication device 200 can be achieved by one or more instructions from the second CPU 204, which is shown in FIG. 2. In response to detecting that information indicating that the current location of the third radio communication device 300 is outside the second radio communication area 250 is attached to the response signal that is transmitted by the third radio communication device 300 that is executing communication with the first radio communication device 100, the second disconnection processing unit 2006 can create disconnection instruction information, and the disconnection instruction information can be transmitted to the third radio communication device 300 from the second transceiver 2002.

The second communication controller 2008 of the second radio communication device 200 can be achieved by one or more instructions from the second communication controller 210, which is shown in FIG. 2; and the second communication controller 2008 can execute communication control, such as transmitting setup information to the third radio communication device 300 with which the connection process is executed by the second connection processing unit 2004.

The storage/read processing unit 2010 of the second radio communication device 200 can be achieved by one or more instructions from the second CPU 204, which is shown in FIG. 2, and the second ROM 206, which is shown in FIG. 2 as an example. The storage/read processing unit 2010 can store various types of data in the storage unit 2012, and the storage/read processing unit 2010 can execute a process of reading out the various types of data stored in the storage unit 2012.

<Third Radio Communication Device 300>

The third radio communication device 300 may include a second transceiver 3002; a communication range determining unit 3004; a second connection processing unit 3006; a setup information retrieval unit 3008; a second disconnection processing unit 3010; a permission transfer unit 3012; a permission processing unit 3014; a first transceiver 3016; a first connection processing unit 3018; a first disconnection processing unit 3020; a storage/read processing unit 3022; and a storage unit 3024. These units can be functions or units that can be achieved by operating some components of the third radio communication device 300, which are shown in FIG. 3, by one or more instructions from one or more of the third CPU 306 and the fourth CPU 316 in accordance with one or more of the program for the first radio communication device that is stored in the third ROM 306 and the program for the second radio communication device that is stored in the fourth ROM 318.

(Third Radio Communication Device Management Table)

In the storage unit 3024, a third radio communication device management DB 3026 is provided, which includes a third radio communication device management table. For the third radio communication device management table, the above-described Table 2 may be adopted.

<Functional Units of the Third Radio Communication Device 300>

Next, each element of the third radio communication device 300 is described in detail.

The second transceiver 3002 of the third radio communication device 300 can be achieved by the fourth communication circuit 314, which is shown in FIG. 3, and one or more instructions from the fourth CPU 316; and the second transceiver 3002 can communicate various types of data (information) with the second radio communication device 200 by the second radio communication method.

The communication range determining unit 3004 of the third radio communication device 300 can be achieved by one or more instructions from the fourth CPU 316, which is shown in FIG. 3. The communication range determining unit 3004 can determine whether the current location of the third radio communication device 300 is within the second radio communication area 250 by comparing the communication range information that is transmitted by the second radio communication device 200 with the current location of the third radio communication device 300 that is detected by the positioning device. The communication range determining unit 3004 can create a response signal to which information indicating whether the current location of the third radio communication device 300 is within the second radio communication area 250, and the response signal can be transmitted from the second transceiver 3002.

The second connection processing unit 3006 of the third radio communication device 300 can be achieved by one or more instructions from the fourth CPU 316, which is shown in FIG. 3; and the second connection processing unit 3006 can execute a connection process with the second radio communication device 200 by the second radio communication method.

The setup information retrieval unit 3008 of the third radio communication device 300 can be achieved by one or more instructions from the fourth CPU 316, which is shown in FIG. 3; and the setup information retrieval unit 3008 can obtain, from the second transceiver 3002, the setup information that is transmitted by the second radio communication device 200, with which the connection process is executed by the second connection processing unit 3006.

The second disconnection processing unit 3010 of the third radio communication device 300 can be achieved by one or more instructions from the fourth CPU 316, which is shown in FIG. 3. The second disconnection processing unit 3010 can disconnect communication with the second radio communication device 200 in the second radio communication method.

The permission transfer unit 3012 of the third radio communication device 300 can be achieved by one or more instructions from the fourth CPU 316, which is shown in FIG. 3. If the third radio communication device 300 is the master device, the permission transfer unit 3012 of the third radio communication device 300 can execute a process of transferring the authority to permit communication to another third radio communication device 300 by making assignment.

The permission processing unit 3014 of the third radio communication device 300 can be achieved by one or more instructions from the fourth CPU 316, which is shown in FIG. 3. If the third radio communication device 300 is the master device, the permission processing unit 3014 of the third radio communication device 300 can create, upon detecting presence of a third radio communication device 300 that newly enters the second radio communication area 250, a response (communication permission information) for permitting the detected third radio communication device 300 to execute communication with the first radio communication device 100, and the response can be transmitted to the second radio communication device 200 from the second transceiver 3002.

The first transceiver 3016 of the third radio communication device 300 can be achieved by the third communication circuit 304, which is shown in FIG. 3, and one or more instructions from the third CPU 306; and the first transceiver 3016 can communicate various types of data (information)

with the first radio communication device 100 by the first radio communication method.

The first connection processing unit 3018 of the third radio communication device 300 can be achieved by one or more instructions from the third CPU 306, which is shown in FIG. 3; and the first connection processing unit 3018 can execute a connection process with the first radio communication device 100 by the first communication method.

The first disconnection processing unit 3020 of the third radio communication device 300 can be achieved by one or more instructions from the third CPU 306, which is shown in FIG. 3. The first disconnection processing unit 3020 can disconnect communication with the first radio communication device 100 by the first communication method. The storage/read processing unit 3022 of the third radio communication device 300 can be achieved by one or more instructions from the third CPU 306 and the fourth CPU 316, which are shown in FIG. 3, and the third ROM 308 and the fourth ROM 318, which are shown in FIG. 3 as examples. The storage/read processing unit 3022 can store various types of data in the storage unit 3024; and the storage/read processing unit 3022 can execute a process of reading out the various types of data stored in the storage unit 3024.

<Operation of the Radio Communication System (Version 1)>

Figure 7:
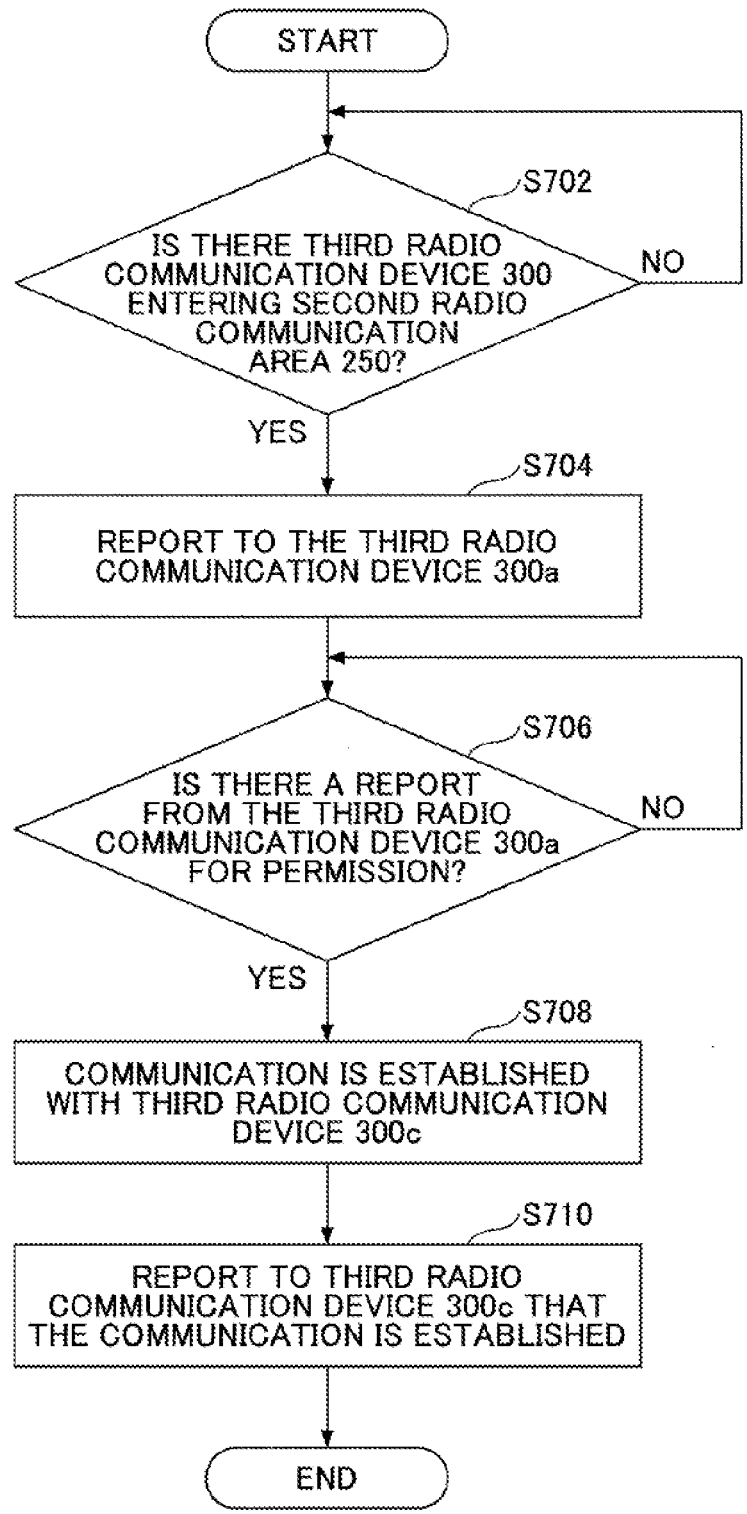
FIG. 7 is a flowchart illustrating an operation (version 1) of the radio communication system according to the embodiment.

FIG. 7 shows operation of the radio communication system (version 1). FIG. 7 shows operation, upon detecting that the third radio communication device 300c that is located outside the second radio communication area 250 enters the second radio communication area 250, of the radio communication system that is shown in FIG. 1. In the radio communication system, it is assumed that the third radio communication device 300a is the master device.

At step S702, the second connection processing unit 2004 of the second radio communication device 200 determines whether there is a third radio communication device 300 that newly enters the second radio communication area 250. For example, the second connection processing unit 2004 determines whether there is a third radio communication device 300 that newly enters the second radio communication area 250 by determining whether a response that is transmitted by the third radio communication device 300 that newly enters the second radio communication area 250 is the information indicating that current location of the third radio communication device 300 that newly enters the second radio communication area 250 is within the second radio communication area 250. Upon detecting that there is no third radio communication device 300 that newly enters the second radio communication area 250, the process returns to step S702.

At step S704, in response to determining that there is a third radio communication device 300 that newly enters the second radio communication area 250, the second connection processing unit 2004 of the second radio communication device 200 determines that the third radio communication device 300a is the master device by referring to the third radio device management table of the third radio device management DB 2016. The second connection processing unit 2004 reports to the third radio communication device 300a that the third radio communication device 300c newly enters the second radio communication area 250.

At step S706, the second connection processing unit 2004 of the second radio communication device 200 determines whether there is a report (communication permission information), from the third radio communication device 300a, that permits the third radio communication device 300c to communicate. Upon detecting that a report indicating the presence of the third radio communication unit 300c that newly enters the second radio communication area 250 is input from the second transceiver 2002 of the second radio communication device 200, the permission processing unit 3014 of the third radio communication device 300a prompts, through a user interface (UI), a user to select whether to permit the third radio communication device 300c to communicate. Upon visually detecting the third radio communication device 300c, the user may permit the third radio communication device 300c to communicate; however, if the third radio communication device 300c may not be visually confirmed because the third radio communication device 300c is located outside a conference room or a partition, the user may disallow the third radio communication device 300c to communicate. In this manner, security risk can be reduced. In response to detecting that there is no report of permission from the third radio communication device 300a, the process returns to step S706, and the third radio communication device 300c transitions to a state of waiting for establishment of communication. In this case, an icon that indicates "a waiting state" may be displayed on a UI of the third radio communication device 300c. In this manner, the user of the third radio communication device 300c can be informed that the communication with the first radio communication device 100 is not established yet. Whereas, an icon indicating "waiting for permission to communicate" may be displayed on a status bar, for example, of the UI of the third radio communication device 300a because it is possible that the user of the third radio communication device 300a does not recognize that permission for the third radio communication device 300c to communicate is requested.

At step S708, upon detecting a report, from the third radio communication device 300a, for permitting the third radio communication device 300c to communicate, the second connection processing unit 2004 of the second radio communication device 200 establishes communication with the third radio communication device 300c. Specifically, in the sequence that is shown in FIG. 4 the process at and after step S3 can be applied. Namely, the setup information is transmitted from the second radio communication device 200 to the third radio communication device 300c.

At step S710, after establishing the communication with the third radio communication device 300c, the second communication controller 2008 of the second radio communication device 200 reports to the third radio communication device 300c that the communication is established through the second transceiver 2002.

For example, for a case where the third radio communication device 300c may not be visually confirmed because the third radio communication device 300c is hidden by a wall and/or a partition, or for a case where the third radio communication device 300c is used by a malicious user, even if the user of the third radio communication device 300c attempts to establish communication with the second radio communication device 200, the communication may not be established because permission may not be obtained from the master device. In this manner, erroneous connection with the third radio communication device 300c can be prevented, and thereby security of the radio communication system can be enhanced.

<Operation of the Radio Communication System (Version 2)>

Figure 8:
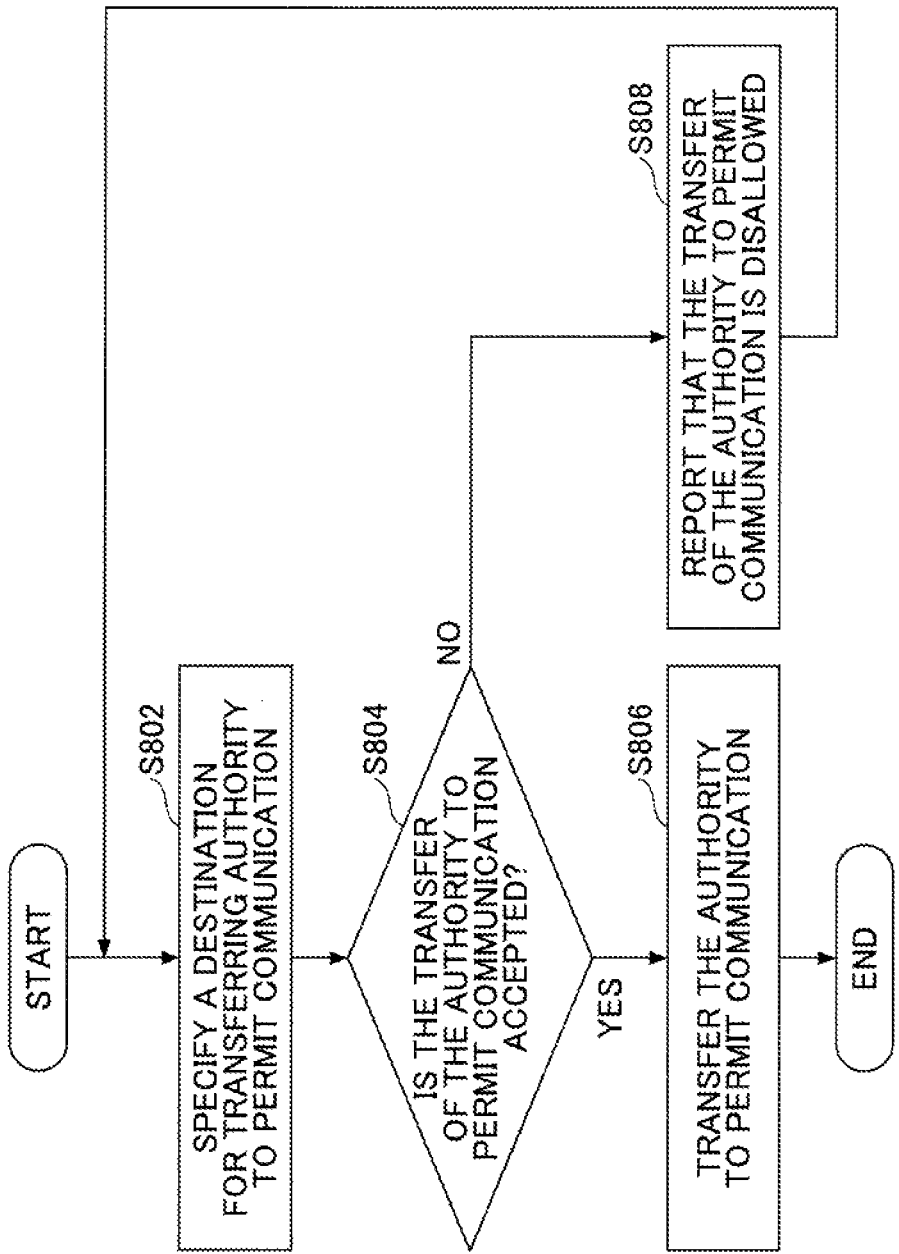
FIG. 8 is a flowchart illustrating an operation (version 2) of the radio communication system according to the embodiment.

FIG. 8 shows operation of the radio communication system (version 2). FIG. 8 shows, in the radio communication system that is shown in FIG. 1, a process of transferring, by making assignment, the authority to permit communication from the third radio communication device 300a that is located within the second radio communication area 250 to the third radio communication device 300b.

At step S802, a destination of transferring the authority to permit communication is specified in the permission transfer unit 3012 of the third radio communication device 300a. Here, a user specifies, as the destination of transfer, the third radio communication device 300b in the permission transfer unit 3012 of the third radio communication device 300a. The permission transfer unit 3012 of the third radio communication device 300a reports, through the second transceiver 3002, to the third radio communication device 300b that the third radio communication device 300b is specified as the destination of transferring the authority to permit communication. This report is transmitted to the third radio communication device 300b via the second radio communication device 200.

At step 804, the report that is transmitted by the third radio communication device 300a is input to the permission transfer unit 3012 of the third radio communication device 300b; and a screen for selecting whether transfer of the authority to permit communication is accepted is displayed on the UI of the third radio communication device 300b. A user of the third radio communication device 300b can select, through the UI, whether the transfer of the authority to permit communication is accepted.

At step S806, upon detecting that, in the permission transfer unit 3012 of the third radio communication device 300b, selection is made to accept the transfer of the authority to permit communication, the permission transfer unit 3012 of the third radio communication device 300b reports, from the second transceiver 3002 to the third radio communication device 300a, that the transfer of the authority to permit communication is accepted. This report is transmitted to the third radio communication device 300a via the second radio communication device 200. Upon receiving, from the third radio communication device 300b, the report indicating that the transfer of the authority to permit communication is accepted, the permission transfer unit 3012 of the third radio communication device 300a transfers the authority to permit communication to the third radio communication device 300b. Specifically, the permission transfer unit 3012 of the third radio communication device 300a requests the second radio communication device 200 to update the column that indicates the presence or absence of the authority to permit communication in the third radio communication device management table of the third radio communication device management DB 2016. After updating the third radio communication device management table, the second communication controller 2008 of the second radio communication device 200 transmits the updated third radio communication device management table to all the third radio communication devices 300 that are located within the second radio communication area 250. In this manner, it can be reported that the third radio communication device 300c functions as the master device.

At step S808, upon detecting, in the permission transfer unit 3012 of the third radio communication device 300b, selection is made not to accept the transfer of the authority to permit communication, the permission transfer unit 3012 of the third radio communication device 300b reports, from the second transceiver 3002 to the third radio communication device 300a, that the transfer of the authority to permit communication is not accepted, and the process returns to step S802. In this manner, the user of the third radio communication device 300a can specify another third radio communication device as a destination of transferring the authority to permit communication.

<Operation of the Radio Communication System (Version 3)>

Figure 9:
FIG. 9 is a flowchart illustrating an operation (version 3) of the radio communication system according to the embodiment.

FIG. 9 shows operation of the radio communication system (version 3). FIG. 9 shows, in the radio communication system that is shown in FIG. 1, operation of disconnecting, by the third radio communication device 300a, the communication with the first communication device 100 due to inability to maintain the communication with the first radio communication device 100, such as a case where the third radio communication device 300a that is located within the second radio communication area 250 and that is executing communication with the first radio communication device 100 moves out the second radio communication area 250. For disconnecting the communication with the first radio communication device 100, the third radio communication device 300a disconnects the communication after transferring the authority to permit communication because the third radio communication device 300a is the master device. Here, a case is described where the authority to permit communication is transferred from the third radio communication device 300a to the third radio communication device 300b.

At step S902, in response to detecting that the third radio communication device 300a moves out the second radio communication area 250, the first disconnection processing unit 3020 starts a process of disconnecting the communication with the first radio communication device 100.

For the process of steps S904 to S910, the process of steps S802 to S808 of FIG. 8 can be applied.

At step S912, the first disconnection processing unit 3020 of the third radio communication device 300a disconnects the communication with the first radio communication device 100. Specifically, in the sequence that is shown in FIG. 5, the process at and after step S13 can be applied. Namely, a disconnection instruction is transmitted from the second radio communication device 200 to the third radio communication device 300a.

In this manner, even if the communication between the third radio communication device 300a that was the master device and the first radio communication device 100 is disconnected, security of the radio communication system can be maintained because the authority to permit communication is transferred to the third radio communication device 300b.

<Operation of the Radio Communication System (Version 4)>

Figure 10:
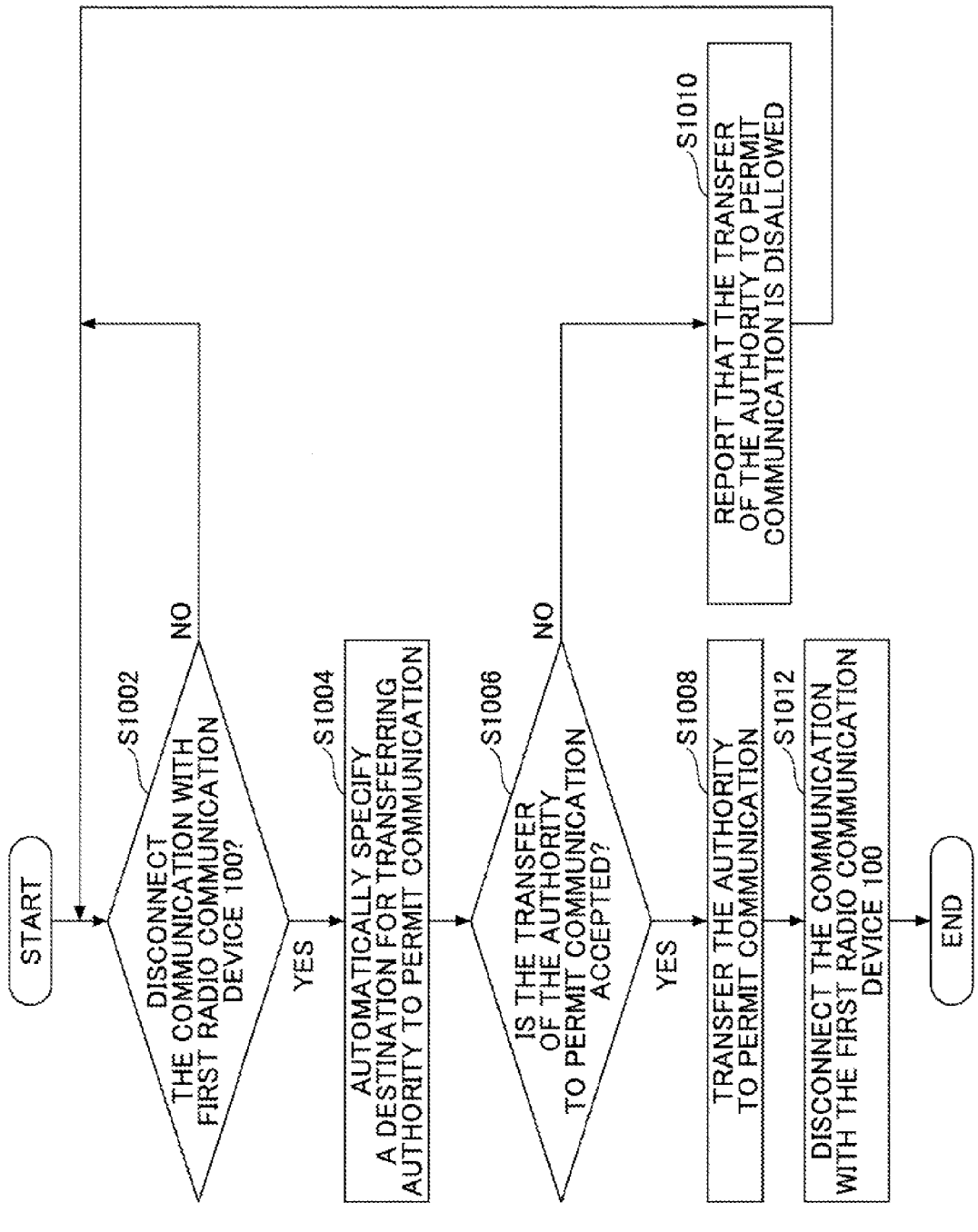
FIG. 10 is a flowchart illustrating an operation (version 4) of the radio communication system according to the embodiment.

FIG. 10 shows operation of the radio communication system (version 4). FIG. 10 shows, in the radio communication system that is shown in FIG. 1, operation of disconnecting, by the third radio communication device 300a, the communication with the first communication device 100 due to inability to maintain the communication with the first radio communication device 100, such as a case where the third radio communication device 300a that is located within the second radio communication area 250 and that is executing communication with the first radio communication device 100 moves out the second radio communication area 250. For disconnecting the communication with the first radio communication device 100, the third radio communication device 300a transfers, by making assignment, the authority to permit communication because the third radio communication device 300a is the master device. Here, a third radio communication device 300 that is the destination of transferring, from the third radio communication device 300a, the authority to permit communication can be automatically selected.

For step S1002, step S902 of FIG. 9 can be applied.

At step S1004, the permission transfer unit 3012 of the third radio communication device 300a refers to the third radio communication device management table that is stored in the third radio communication management DB 3026 of the storage device 3024, and the permission transfer unit 3012 automatically selects the destination of transferring the authority to permit communication. For example, the permission transfer unit 3012 may select a third radio communication device 300 in descending order of communication time among third radio communication devices that are located within the second radio communication area 250 and that are executing communication with the first radio communication device 100; or the permission transfer unit 3012 may randomly select a third radio communication device 300 among third radio communication devices that are located within the second radio communication area 250 and that are executing communication with the first radio communication device 100. It can be expected that the third radio communication device 300 with long communication time can recognize conditions of other third radio communication devices 300, and that the third radio communication device 300 with the long communication time can be highly reliable. Thus, even if the authority to permit communication is transferred to the third radio communication device 300 with long communication time, it is expected that a security level that is the same as that prior to the transfer can be maintained.

For steps S1006 to S1012, Steps S906 to S912 of FIG. 9 can be applied. Here, upon detecting, at step S1006, that the transfer of the authority to permit communication is not accepted, the process returns to step S1002 after the process of step S1010, and the process of step S1004 is executed again. In this case, a third radio communication device 300 other than the previously selected third radio communication device 300 is to be selected at step S1004.

In this manner, even if the communication between the third radio communication device 300a that was the master device and the first radio communication device 100 is disconnected, the authority to permit communication can be automatically transferred to a third radio communication device 300 other than the third radio communication device 300a. Thus, a user may not be required to consider the destination of the transfer of the authority to permit communication.

<Operation of the Radio Communication System (Version 5)>

Figure 11:
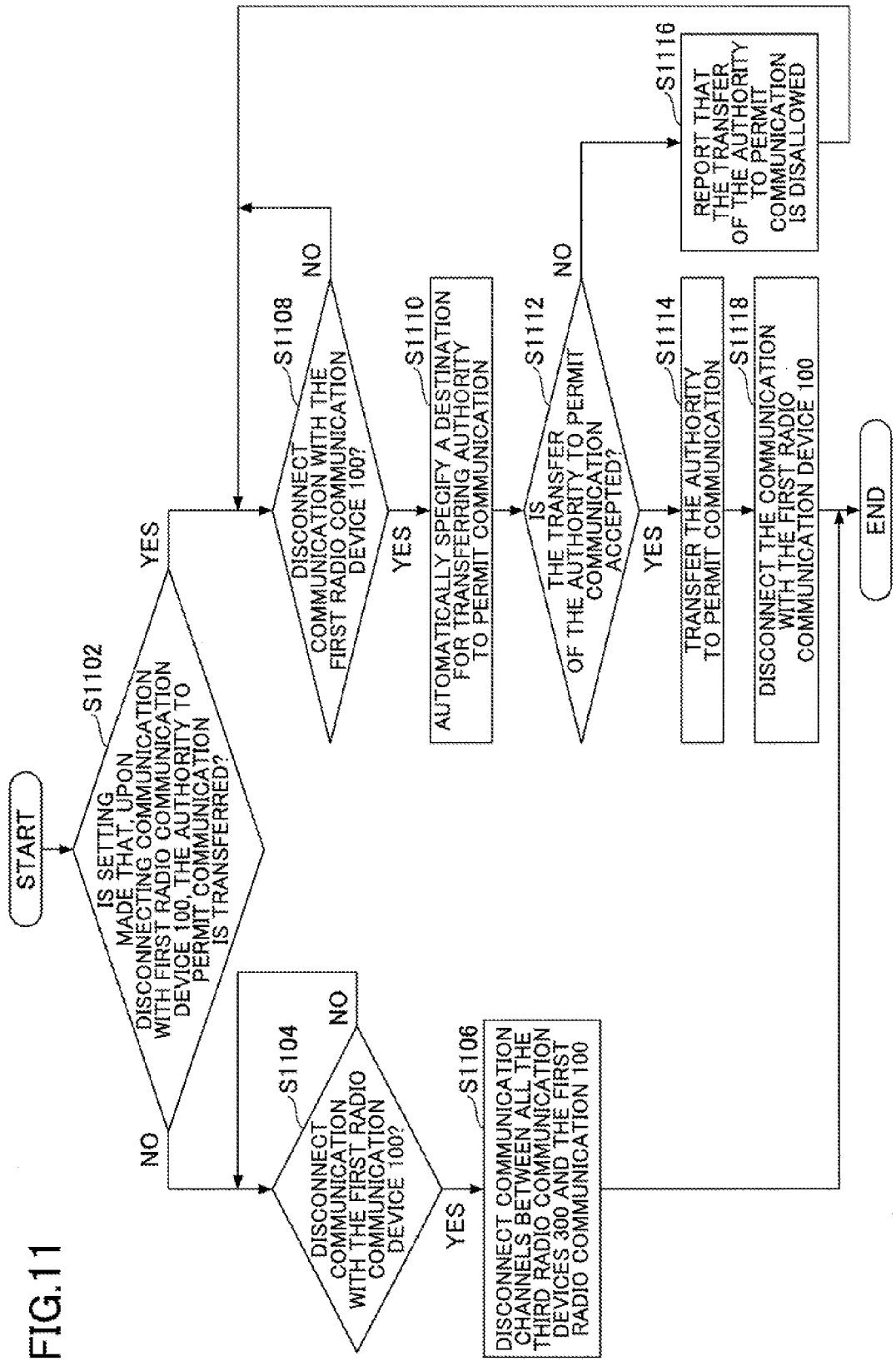
FIG. 11 is a flowchart illustrating an operation (version 5) of the radio communication system according to the embodiment.

FIG. 11 shows operation of the radio communication system (version 5). FIG. 11 shows, in the radio communication system that is shown in FIG. 1, operation of disconnecting, by the third radio communication device 300a, the communication with the first communication device 100 due to inability to maintain the communication with the first radio communication device 100, such as a case where the third radio communication device 300a that is located within the second radio communication area 250 and that is executing communication with the first radio communication device 100 moves out the second radio communication area 250.

A setting is made in the third radio communication device 300a such that, during disconnection of the communication with the first radio communication device 100, the authority to permit communication is to be automatically transmitted; or the communication is disconnected for all the third radio communication devices 300 that establish communication with the first radio communication device 100.

At step S1102, the permission transfer unit 3012 of the third radio communication device 300a determines whether a setting is made to transfer the authority to permit communication during disconnection of the communication with the first radio communication device 100.

At step S1104, upon detecting that no setting is made to transfer the authority to permit communication during disconnection of the communication with the first radio communication device 100, the first disconnection processing unit 3020 starts a process of disconnecting the communication with the first radio communication device 100, in response to detecting that the third radio communication device 300a moves out the second radio communication area 250.

At step S1106, the first disconnection processing unit 3020 of the third radio communication device 300a instructs the first radio communication device 100 to disconnect the communication with all the third radio communication devices 300. In accordance with the instruction by the third radio communication device 300a, the first disconnection processing unit 1006 of the first radio communication device 100 disconnects the communication with all the third radio communication devices 300.

At step S1108, upon detecting that a setting is made to transfer the authority to permit communication during disconnection of the communication with the first radio communication device 100, the first disconnection processing unit 3020 starts a process of disconnecting the communication with the first radio communication device 100, in response to detecting that the third radio communication device 300a moves out the second radio communication area 250. For steps S1110 to S1118, steps S1004 to S1012 of FIG. 10 can be applied.

A setting is made in the third radio communication device 300 such that, for a case where the third radio communication device 300 has the authority to permit communication and the communication with the first radio communication device 100 is to be disconnected, the authority to permit communication is to be transferred; or the communication is disconnected for all the third radio communication devices 300 that establish communication with the first radio communication device 100. In this manner, a security level can be changed depending on a situation, and the security level of the radio communication system can be maintained.

The communication device, the communication method, and the communication system are described above by the embodiments. However, the present invention is not limited to the above-described embodiments, and various modifications and improvements can be made within the scope of the present invention. Specific examples of numerical values are used in order to facilitate understanding of the invention. However, these numerical values are simply illustrative, and any other appropriate values may be used, except as indicated otherwise. The separations of the items in the above explanation are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. For the convenience of explanation, the communication device and the communication system are explained by using the functional block diagrams. However, these devices may be implemented in hardware, software, or combinations thereof. The software that operates in accordance with the present invention may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

The present application is based on and claims the benefit of priority of Japanese Patent Application No. 2015-034420, filed on Feb. 24, 2015, the entire contents of which are hereby incorporated by reference.

What is claimed is:

1. A communication device comprising:
a first communication unit configured to execute radio communication by using a first communication method, the first communication method allowing the radio communication to be executed within a first communication range;
a second communication unit configured to execute radio communication by using a second communication method, the second communication method allowing the radio communication to be executed within a second communication range which is encompassed by the first communication range; and
a permission processing unit configured to generate communication permission information to permit executing the radio communication by the first communication method,
wherein the second communication unit is configured to receive setting information for establishing the radio communication by the first communication method, and
wherein the first communication unit is configured to execute the radio communication by using the first communication method with another communication device that receives the setting information and the communication permission information, and upon said another communication device exiting from the second communication range, the first communication unit disconnects the radio communication established with said another communication device by the first communication method.

2. The communication device according to claim 1, wherein the second communication unit is configured to transmit the communication permission information that is generated by the permission processing unit.

3. The communication device according to claim 1, further comprising:
a permission transfer unit configured to transfer, to the other communication device, authority to generate the communication permission information to permit executing the radio communication by the first communication method.

4. The communication device according to claim 3, wherein the permission transfer unit is configured to transfer, to the other communication device, the authority to generate the communication permission information in accordance with a user operation.

5. The communication device according to claim 3, wherein the permission transfer unit is configured to make, in advance, a setting of whether to transfer, to the other communication device, the authority to generate the communication permission information.

6. The communication device according to claim 3, wherein, upon detecting that the radio communication by the first communication unit is disconnected, the permission transfer unit is configured to transfer, to the other communication device, the authority to generate the communication permission information.

7. A communication system comprising:
a first communication device; and
a second communication device,
wherein the first communication device includes
a first communication unit configured to execute radio communication by using a first communication method, the first communication method allowing the radio communication to be executed within a first communication range;
a second communication unit configured to execute radio communication by using a second communication method, the second communication method allowing the radio communication to be executed within a second communication range which is encompassed by the first communication range; and
a permission processing unit configured to generate communication permission information to permit executing the radio communication by the first communication method,
wherein the second communication unit is configured to receive setting information for establishing the radio communication by the first communication method, and
wherein the first communication unit is configured to execute the radio communication by using the first communication method with the second communication device that receives the setting information and the communication permission information, and upon the second communication device exiting from the second communication range, the first communication unit disconnects the radio communication established with said another communication device by the first communication method,
wherein the second communication device includes
a third communication unit configured to execute radio communication by using the first communication method, the first communication method allowing the radio communication to be executed within the first communication range; and
a fourth communication unit configured to execute radio communication by using the second communication method, the second communication method allowing the radio communication to be executed within the second communication range,
wherein the fourth communication unit is configured to receive the setting information for establishing the radio communication by the first communication method, and
wherein, upon receiving the setting information and the communication permission information, the third communication unit is configured to execute the radio communication by using the first communication method.

8. A communication method to be executed by a communication device including
a first communication unit configured to execute radio communication by using a first communication method, the first communication method allowing the radio communication to be executed within a first communication range; and a second communication unit configured to execute radio communication by using a second communication method, the second communication method allowing the radio communication to be executed within a second communication range which is encompassed by the first communication range, wherein the method comprises:

a step of generating communication permission information to permit executing the radio communication by the first communication method;

a step of receiving, by the second communication unit, setting information for establishing the radio communication by the first communication method;

a step of executing, by the first communication unit, the radio communication by using the first communication method with another communication device that receives the setting information and the communication permission information; and a step of disconnecting, upon said another communication device exiting from the second communication range, the radio communication established with said another communication device by the first communication unit, by using the first communication method.

* * * * *